US008043717B2

(12) United States Patent
Kulkarni et al.

(10) Patent No.: US 8,043,717 B2
(45) **Date of Patent: *Oct. 25, 2011**

(54) COMBUSTION TURBINE COMPONENT HAVING RARE EARTH CONICRAL COATING AND ASSOCIATED METHODS

(75) Inventors: Anand A. Kulkarni, Oviedo, FL (US); Allister W. James, Orlando, FL (US); Douglas J. Arrell, Oviedo, FL (US)

(73) Assignee: Siemens Energy, Inc., Orlando, FL (US)

(*) Notice: Subject to any disclaimer, the term of this patent is extended or adjusted under 35 U.S.C. 154(b) by 319 days.

This patent is subject to a terminal disclaimer.

(21) Appl. No.: 12/194,577

(22) Filed: Aug. 20, 2008

(65) Prior Publication Data

US 2009/0075101 A1 Mar. 19, 2009

Related U.S. Application Data

(60) Provisional application No. 60/972,371, filed on Sep. 14, 2007.

(51) Int. Cl.
*B32B 15/04* (2006.01)
*C23C 4/06* (2006.01)

(52) U.S. Cl. ..... 428/632; 428/621; 428/639; 416/241 R; 427/456; 427/419.2; 427/422; 427/250

(58) Field of Classification Search ........................ None
See application file for complete search history.

(56) References Cited

U.S. PATENT DOCUMENTS

| | | | | |
|---|---|---|---|---|
| 3,873,347 | A | 3/1975 | Walker et al. | |
| 3,928,026 | A | 12/1975 | Hecht et al. | |
| 4,198,442 | A | 4/1980 | Gupta et al. | |
| 4,340,425 | A | 7/1982 | Barrett et al. | |
| 4,447,503 | A * | 5/1984 | Dardi et al. | 428/632 |
| 4,485,151 | A | 11/1984 | Stecura | |
| 4,615,865 | A | 10/1986 | Duvall et al. | |
| 4,687,678 | A * | 8/1987 | Lindblom | 427/453 |
| 5,045,404 | A | 9/1991 | Ohmura et al. | |
| 5,049,355 | A | 9/1991 | Gennari et al. | |
| 5,154,885 | A | 10/1992 | Czech et al. | |
| 5,160,390 | A | 11/1992 | Yukumoto et al. | |
| 5,268,238 | A * | 12/1993 | Czech et al. | 428/678 |
| 5,273,712 | A | 12/1993 | Czech et al. | |
| 5,277,936 | A * | 1/1994 | Olson et al. | 427/453 |
| 5,426,084 | A | 6/1995 | Fukaya et al. | |
| 5,455,119 | A * | 10/1995 | Taylor et al. | 428/632 |
| 5,565,167 | A | 10/1996 | Fujimoto et al. | |
| 5,578,265 | A | 11/1996 | Ericson et al. | |
| 6,180,259 | B1 * | 1/2001 | Harada et al. | 428/615 |
| 6,231,807 | B1 | 5/2001 | Berglund | |
| 6,416,882 | B1 | 7/2002 | Beele et al. | |
| 6,562,480 | B1 | 5/2003 | Stong et al. | |

(Continued)

FOREIGN PATENT DOCUMENTS

GB 2056487 A 3/1981

(Continued)

*Primary Examiner* — Aaron Austin

(57) ABSTRACT

A combustion turbine component (10) includes a combustion turbine component substrate (16) and an alloy coating (14) on the combustion turbine component substrate. The alloy coating (14) includes a first amount, by weight percent, of cobalt (Co) and a second amount, by weight percent, of nickel (Ni), the first amount being greater than the second amount. The alloy coating further includes chromium (Cr), aluminum (Al), at least one rare earth element, and an oxide of the at least one rare earth element.

35 Claims, 8 Drawing Sheets

U.S. PATENT DOCUMENTS

| | | | |
|---|---|---|---|
| 6,569,221 | B2 | 5/2003 | Berglund |
| 6,641,917 | B2 | 11/2003 | Itsukaichi et al. |
| 6,719,855 | B2 | 4/2004 | Fukuda et al. |
| 6,773,660 | B2 | 8/2004 | Cedergren et al. |
| 6,818,315 | B2 | 11/2004 | Lintunen et al. |
| 6,818,321 | B2 | 11/2004 | Okazaki et al. |
| 6,875,464 | B2 | 4/2005 | Ruud et al. |
| 7,157,151 | B2 | 1/2007 | Creech et al. |
| 7,238,005 | B2 | 7/2007 | Takahashi et al. |
| 2005/0271514 | A1 | 12/2005 | Lee et al. |
| 2005/0282020 | A1 | 12/2005 | Stowell et al. |
| 2006/0166029 | A1 | 7/2006 | Inaguma et al. |
| 2006/0193993 | A1 | 8/2006 | Dorfman et al. |
| 2006/0246226 | A1 | 11/2006 | Dai et al. |
| 2006/0292390 | A1 | 12/2006 | Kassner et al. |
| 2007/0041862 | A1 | 2/2007 | Hattendorf et al. |
| 2007/0065675 | A1 | 3/2007 | Stamm |
| 2007/0144634 | A1 | 6/2007 | Miyazaki et al. |
| 2007/0187005 | A1 | 8/2007 | Taylor |
| 2007/0248457 | A1 | 10/2007 | Dodd et al. |
| 2007/0292300 | A1 | 12/2007 | Rosberg et al. |
| 2008/0026242 | A1 | 1/2008 | Quadakkers et al. |
| 2009/0075110 | A1 * | 3/2009 | Kulkarni et al. .............. 428/548 |
| 2009/0075111 | A1 * | 3/2009 | Kulkarni et al. .............. 428/548 |
| 2009/0075112 | A1 * | 3/2009 | Kulkarni et al. .............. 428/639 |

FOREIGN PATENT DOCUMENTS

| | | | |
|---|---|---|---|
| GB | 2095700 | A | 10/1982 |
| JP | 62067145 | | 3/1987 |
| WO | 0172455 | A1 | 10/2001 |

* cited by examiner

COMBUSTION TURBINE COMPONENT HAVING RARE EARTH CONICRAL COATING AND ASSOCIATED METHODS

RELATED APPLICATION

This application is based upon prior filed provisional application Ser. No. 60/972,371 filed Sep. 14, 2007, the entire subject matter of which is incorporated herein by reference in its entirety.

FIELD OF THE INVENTION

The present invention relates to the field of metallurgy, and, more particularly, to rare-earth strengthened metallic components and methods for making rare-earth strengthened metallic components.

BACKGROUND OF THE INVENTION

Components of combustion turbines are routinely subjected to harsh environments that include rigorous mechanical loading conditions at high temperatures, high temperature oxidization, and exposure to corrosive media. As demands for combustion turbines with higher operating temperatures and efficiency have increased, demand for coatings and materials which can withstand such higher temperatures has increased accordingly.

The structural stability of turbine components is often provided by nickel or cobalt base superalloys, for example, due to their exemplary high temperature mechanical properties such as creep resistance and fatigue resistance.

Creep is the term used to describe the tendency of a solid material to slowly move or deform permanently to relieve stresses. It occurs as a result of long-term exposure to levels of stress that are below the yield strength or ultimate strength of the material. Creep is more severe in materials that are subjected to heat for long periods and near their melting point, such as alloys out of which combustion turbine components are formed. If a turbine blade, for example, were to deform so that it contacted the turbine cylinder, a catastrophic failure may result. Therefore, a high creep resistance is an advantageous property for a combustion turbine component to possess.

Fatigue is the progressive and localized structural damage that occurs when a material is subjected to cyclic loading. Given the numerous fatigue cycles a combustion turbine component may endure, a high fatigue resistance is likewise an advantageous property for a combustion turbine component to possess.

One way to strengthen a material, enhancing both its creep resistance and its fatigue resistance, is known as dispersion strengthening. Dispersion strengthening typically occurs by introducing a fine dispersion of particles into a material, for example, a metallic component. Dispersion strengthening can occur by adding material constituents that form particles when the constituents are added over their solubility limits.

Alternatively, dispersion strengthening may be performed by adding stable particles to a material, in which these particles are not naturally occurring in the material. These particles strengthen the material and may remain unaltered during metallurgical processing. Typically, the closer the spacing of the particles, the stronger the material. The fine dispersion of close particles restricts dislocation movement, which is the mechanism by which creep rupture may occur.

Previous dispersion strengthening methods include the introduction of thoria, alumina, or yttria particles into materials out of which combustion turbine components are formed. Thoria, alumina, and yttria are oxides that possess a higher bond energy than oxides of metals such as iron, nickel, or chromium that are typically used as the base metal of combustion turbine components. These prior approaches, while producing alloys with good high temperature creep resistance, may have poor low temperature performance and oxidation resistance.

For example, U.S. Pat. No. 5,049,355 to Gennari et al. discloses a process for producing a dispersion strengthened alloy of a base metal. A base metal powder and a powder comprising thoria, alumina, and/or yttria are pressed into a blank form. The pressed blank form is sintered so that the thoria, alumina, and/or yttria are homogenously dispersed throughout the base metal.

U.S. Pat. No. 7,157,151 to Creech et. al. is directed to corrosion-resistant coatings for turbine components. In particular, Creech et al. discloses MCrAl(Y,Hf) type coating compositions. In the MCrAl(Y,Hf) coating, M can be selected from among the metals, Co, Ni, Fe, and combinations thereof. The MCrAl(Y,Hf) coating comprises a nominal composition, in weight percent based upon the total weight of the applied MCrAl(Y,Hf) coating, of chromium in the range of 20%-40%, aluminum in the range 6%-15%; and a metal such as Y, Hf, La, or combinations of these metals, in the range of 0.3%-8%. M (Co, Ni, or Fe) is the balance of the MCrAl(Y, Hf) coating, not considering incidental or trace impurities. The MCrAl(Y, hf) coating is then overlaid with a thermal barrier coating.

U.S. Pat. Pub. No. 20080026242 to Quadakkers et al. discloses protective coatings for turbine components. In particular, Quadakkers et al. discloses a component having an intermediate NiCoCrAlY layer zone, which comprises (in wt %), 24-26% Co, 16-18% Cr, 9.5-11% Al, 0.3-0.5% Y, 1-1.8% Re, and a Ni balance. Moreover, according to one embodiment, Y is at least partly replaced in the intermediate NiCoCrAlY layer zone by at least one element selected from the group: Si, Hf, Zr, La, Ce or other elements from the Lanthanide group. Furthermore, the outermost layer could be a MCrAlY layer, wherein M can be selected from Co, Ni, or a combination of both. The outermost layer comprises (in wt %), 15-40% Cr, 5-80% Co, 3-6.5% Al, and Ni is the balance of the coating. Moreover, the outermost layer can contain at least one of Hf, Zr, La, Ce, Y, and other Lanthanides.

U.S. Pat. No. 6,231,807 to Berglund discloses a method of producing a dispersion hardened FeCrAl alloy. A starting powder including iron, chromium, and titanium and/or yttrium is mixed with a chromium nitride powder. The powder mixture is placed into an evacuated container and heat treated. During heat treatment, titanium nitride is formed in a mix of chromium and iron. The nitrided chromium and iron product is then alloyed with aluminum by a conventional process to form a dispersion strengthened FeCrAl alloy.

The pursuit of increased combustion turbine efficiency has led to increased turbine section inlet temperatures, and thus metallic components made from different materials and having increased high temperature creep and fatigue resistance may be desirable. Moreover, materials having these advantageous properties, together with good low temperature performance, improved oxidation resistance, and high temperature particle stability may be desirable.

SUMMARY OF THE INVENTION

In view of the foregoing background, it is therefore an object of the present invention to provide a combustion turbine component having an enhanced alloy coating thereon.

This and other objects, features, and advantages in accordance with the present invention are provided by a combustion turbine component comprising a combustion turbine component substrate and an alloy coating on the combustion turbine component substrate. In some embodiments, the combustion turbine component substrate may be a metallic combustion turbine component substrate. Likewise, in some embodiments, a thermal barrier coating may be on the alloy coating. Moreover, the alloy coating may include a first amount, by weight percent, of cobalt (Co) and a second amount, by weight percent, of nickel (Ni), the first amount being greater than the second amount. Moreover, the alloy coating may include chromium (Cr), aluminum (Al), at least one rare earth element, and an oxide of the at least one rare earth element. In some embodiments, the alloy coating may further include a third amount, by weight percent, of iron (Fe), the third amount being greater than the first amount. In other embodiments, the alloy coating may further comprise yttrium (Y), and at least one of titanium (Ti), tantalum (Ta), tungsten (W), and rhenium (Re). Moreover, in such embodiments, the oxide comprises an oxide of at least one of the yttrium and the at least one rare earth element.

The at least one rare earth element may be at least one of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu).

In some embodiments, the alloy coating may comprise, by percentage of weight, 25% to 30% of Co, 20% to 25% Ni, 3% to 7% of Cr, 3% to 6% of Al, 0.1% to 5%, total, of at least one rare earth element, and may have a balance of Fe and O.

In other embodiments, the alloy coating may comprise, by percentage of weight, 25% to 35% of Ni, 15% to 25% of Cr, 6% to 15% of Al, and 0.05% to 5% of Y. In such embodiments, the alloy coating may further comprise, by percentage of weight, 0.4% to 4%, total, of at least one of Ti, Ta, W, and Re, 0.1% to 5%, total, of at least one rare earth oxide, and may have a balance of Co and O.

In yet other embodiments, the alloy coating may comprise, by percentage of weight, 27% to 29% of Co; 22% to 24% Ni, 4% to 6% of Cr, 4% to 5% of Al, 0.5% to 3%, total, of at least one rare earth element, and may have a balance of Fe and O.

The alloy coating may also comprise, by percentage of weight, 29% to 33% of Ni, 18% to 23% of Cr, 7% to 11% of Al, and 0.1% to 1% of Y. In such an embodiment, the alloy coating may further comprise, by percentage of weight, 0.5% to 3%, total, of at least one of Ti, Ta, W, and Re, 0.5% to 3%, total, of at least one rare earth oxide, and may have a balance of Co and O.

The alloy coating may advantageously provide the combustion turbine component with increased high temperature creep and low temperature performance, and excellent thermodynamic stability. Moreover, the alloy coating may provide the combustion turbine component with increase fatigue and oxidization resistance.

Another embodiment is directed to a method of making a combustion turbine component. The method may include providing a combustion turbine component substrate and forming an alloy coating on the combustion turbine component substrate. The alloy coating may include a first amount, by weight percent, of nickel (Ni) and a second amount, by weight percent, of cobalt (Co), the first amount being greater than the second amount. Moreover, the alloy coating may include chromium (Cr), aluminum (Al), at least one rare earth element, and an oxide of at least one rare earth element. In some embodiments, the alloy coating may further comprise a third amount, by weight percent, of iron (Fe), the third amount being greater than the first amount. In other embodiments, the alloy coating may further comprise yttrium (Y), at least one of titanium (Ti), tantalum (Ta), tungsten (W), and rhenium (Re), and the oxide may comprise an oxide of at least one of the yttrium and the at least one rare earth element.

The method may include atomizing a metallic liquid in an atmosphere to form a metallic powder. The metallic powder may be milled to form a nanosized metallic powder. Moreover, the method may include thermal spraying the nanosized metallic powder onto the combustion turbine component substrate. Thermal spraying the nanosized metallic powder onto the combustion turbine component substrate advantageously provides the combustion turbine component with enhanced properties and performance.

In some embodiments, the method may include atomizing, in an inert atmosphere, a metallic liquid to form a metallic powder. Moreover, a series of heat treating steps may be performed on the metallic powder. A first heat treating step may be performed in an oxidizing atmosphere and a second heat treating step may be performed, for example, in an inert atmosphere. A third heat treating step may be performed in a reducing atmosphere to form a metallic power having an increased proportion of rare-earth oxides compared to non rare-earth oxides. The metallic powder having the increased proportion of rare-earth oxides compared to non rare-earth oxides may be thermally sprayed onto the combustion turbine component.

An increased proportion of rare-earth oxides may advantageously provide the combustion turbine component with the increased creep resistance and the increased fatigue resistance that results from the exemplary thermodynamic stability of rare-earth oxides. Moreover, the rare-earth oxides provide the combustion turbine component with improved high temperature oxidation resistance.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
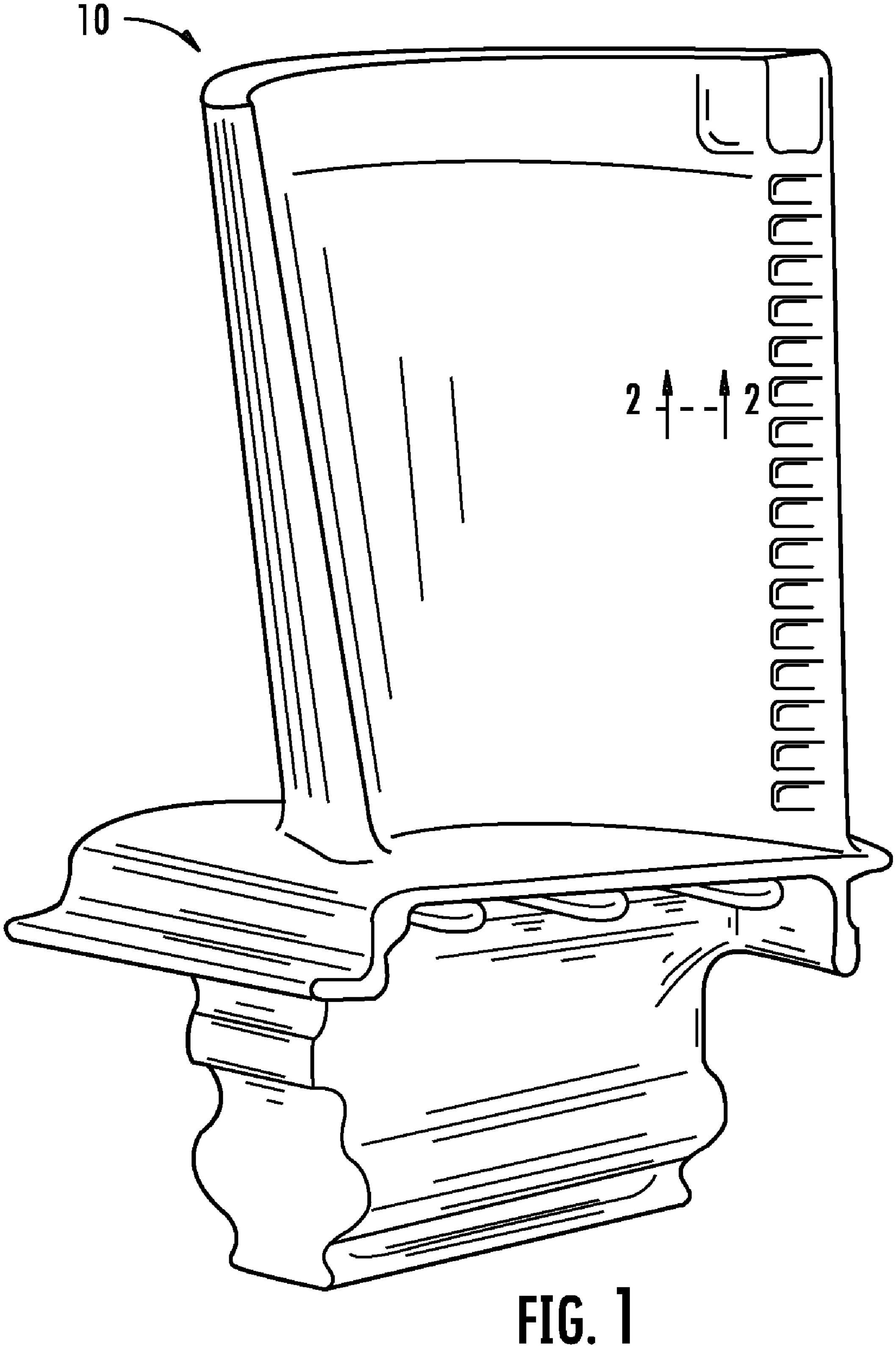
FIG. 1 is a front perspective view of a turbine blade having an alloy coating formed thereon, in accordance the present invention.
Figure 2:
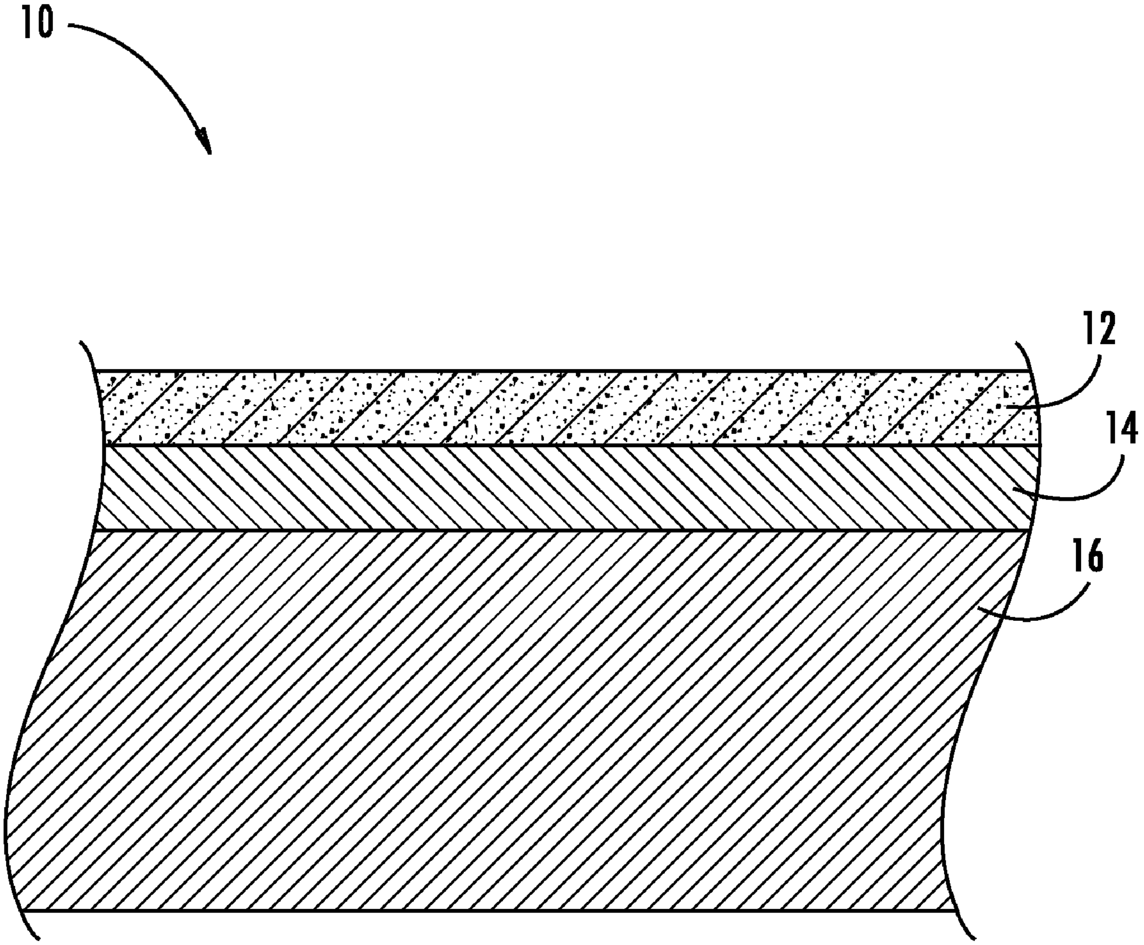
FIG. 2 is a greatly enlarged cross sectional view of the turbine blade taken along line 2-2 of FIG. 1.

Referring initially to FIGS. 1-2, a turbine blade 10 having an alloy coating 14 formed in accordance with the present invention is now described. The turbine blade 10 comprises a metal substrate 16. An alloy coating 14 is on the metal substrate in the root section. A thermal barrier coating 12 is formed on the alloy coating 14.

It will be readily understood by those of skill in the art that the alloy coating 14 discussed above could be formed on any combustion turbine component, such as a diaphragm hook, root of the blade, compressor vane root, casing groove, or blade ring groove. The alloy coatings described herein may also be used on other combustion turbine components as will be appreciated by those skilled in the art.

The alloy coating comprises cobalt (Co), nickel (Ni), chromium (Cr), aluminum (Al), yttrium (Y), at least one rare earth element, and an oxide of at least one of the yttrium and the at least one rare earth element. The alloy coating further comprises at least one of titanium (Ti), tantalum (Ta), tungsten (W), and rhenium (Re).

It will be appreciated by those of skill in the art that the alloy coating may include other suitable elements, oxides, and nitrides.

The at least one rare earth element may be a member of the Lanthanide group, for example lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu). Furthermore, the at least one rare earth element may include a member of the Actinide group. It is to be understood that the alloy coating may include various combinations of such rare earth elements.

In particular, the alloy coating may comprise, by percentage of weight, 25% to 35% of Ni, 15% to 25% of Cr, 6% to 15% of Al, and 0.05% to 5% of Y. The alloy coating may further comprise, by percentage of weight, 0.4% to 4%, total, of at least one of Ti, Ta, W, and Re, 0.1% to 5%, total, of at least one rare earth element, with a balance of Co and O.

In some embodiments, the percentage of weight of the oxides may be 0.2% to 2% and the concentrations of elemental yttrium and rare earth elements may decrease accordingly.

More particularly, the alloy coating may comprise, by percentage of weight 29% to 33% of Ni, 18% to 23% of Cr, 7% to 11% of Al, and 0.1% to 1% of Y. In these embodiments, the alloy coating may further comprise, by percentage of weight, 0.5% to 3%, total, of at least one of Ti, Ta, W, and Re, 0.5% to 3%, total, of at least one rare earth element, with a balance of Co and O. In some embodiments, the percentage of weight of the oxides may be 0.4% to 1% and the concentrations of elemental yttrium and rare earth elements may decrease accordingly. These alloy coatings advantageously provide the combustion turbine component with a high oxidation resistance and improved mechanical strength.

Figure 3:
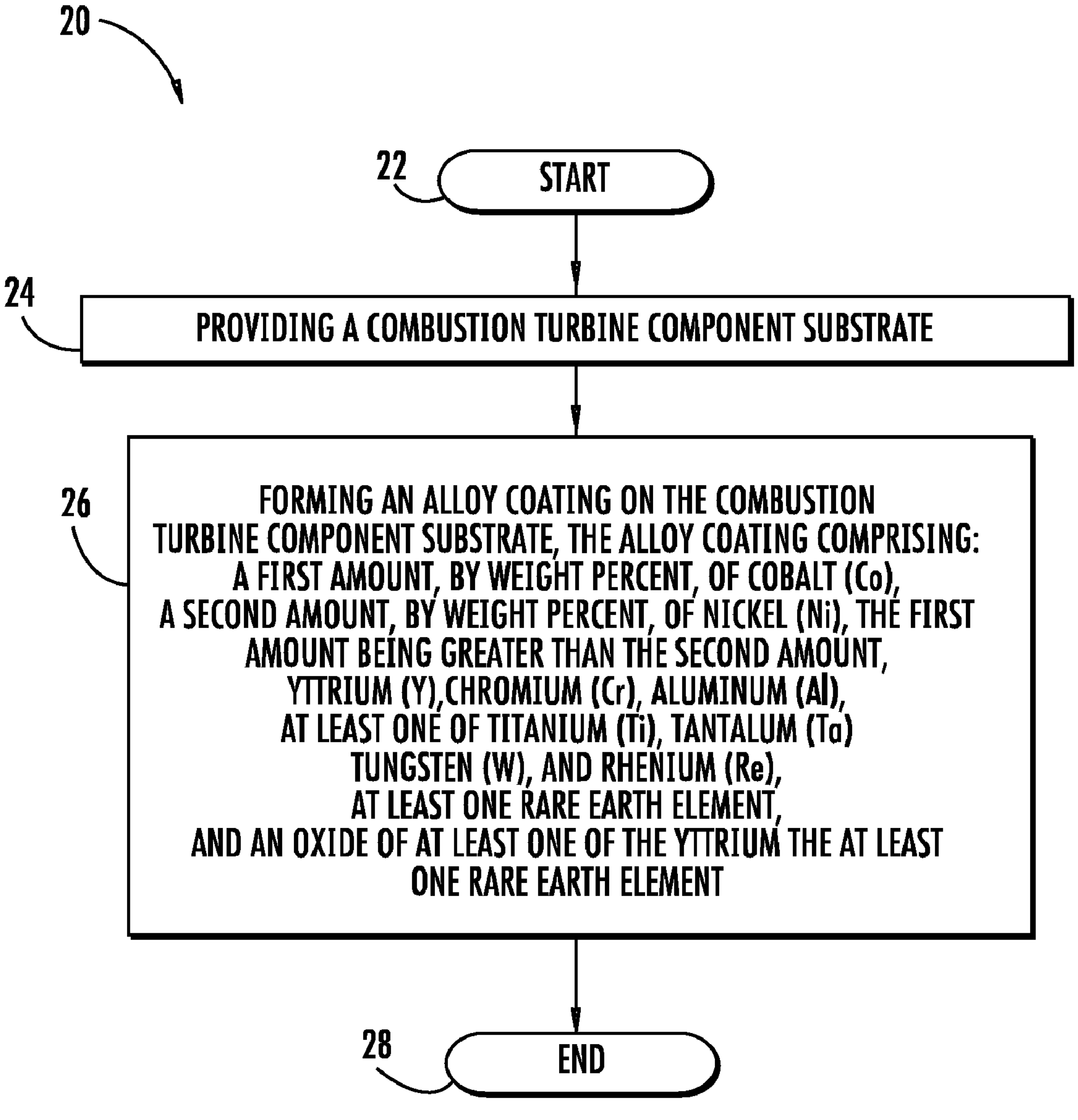
FIG. 3 is a flowchart of a method in accordance with the present invention.

An embodiment of a method of making a combustion turbine component is now described generally with reference to the flowchart 20 of FIG. 3. After the start (Block 22), at Block 24, a combustion turbine component substrate is provided. The combustion turbine component substrate may be a metallic combustion turbine component substrate, or may alternatively be of other suitable materials as will be appreciated by those skilled in the art.

At Block 26 an alloy coating is formed on the combustion turbine component substrate. As explained in detail above, the alloy coating comprises cobalt (Co), nickel (Ni), chromium (Cr), aluminum (Al), yttrium (Y), at least one rare earth element, and an oxide of at least one of the yttrium and the at least one rare earth element. The alloy coating further comprises at least one of titanium (Ti), tantalum (Ta), tungsten (W), and rhenium (Re). More particular compositions of the alloy are explained in detail above.

Figure 4:
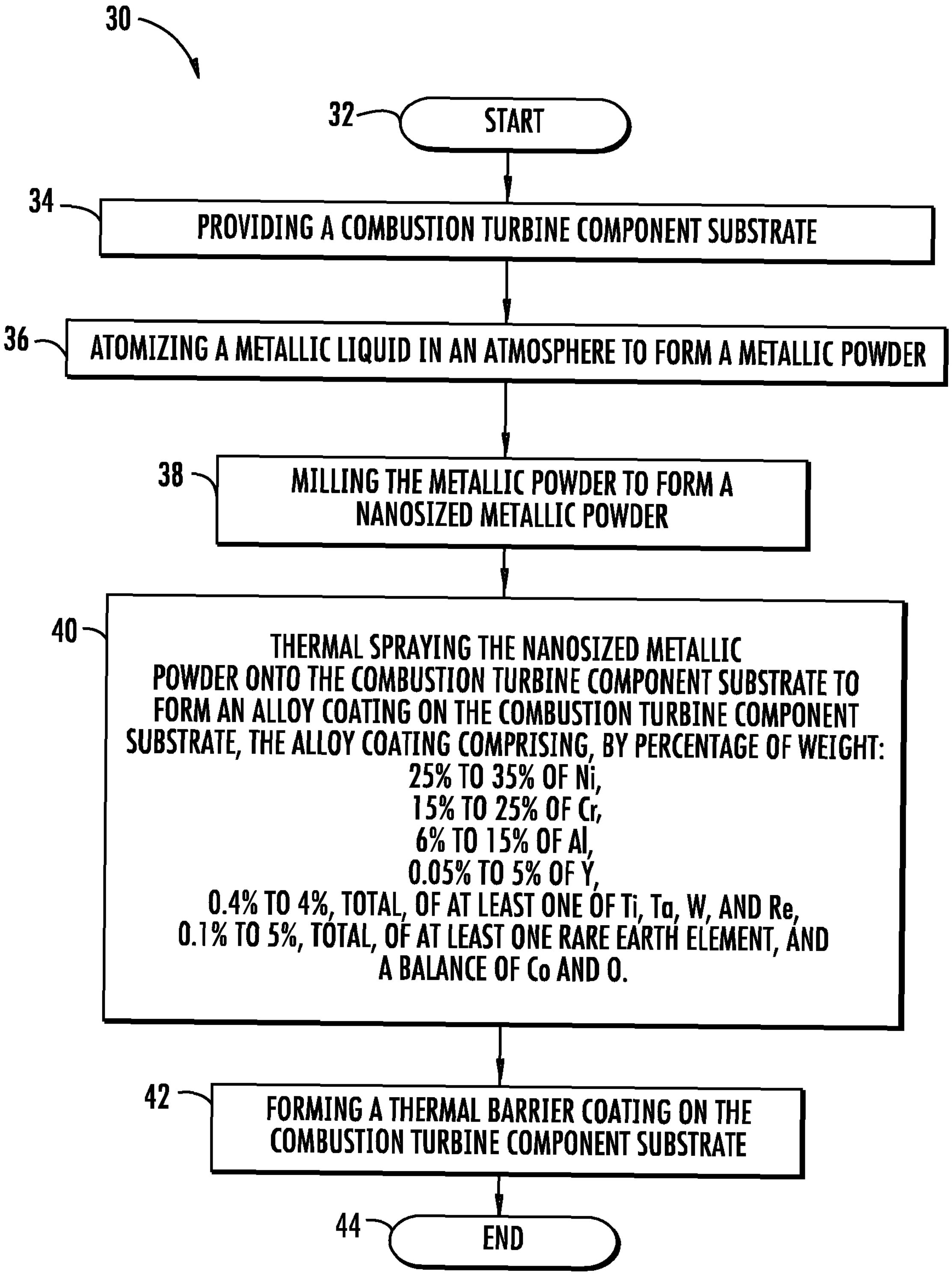
FIG. 4 is a flowchart of an alternative embodiment of a method in accordance with the present invention.

Another embodiment of a method of making a combustion turbine component now described generally with reference to the flowchart 30 of FIG. 4. After the start (Block 32), at Block 34, a combustion turbine component substrate is provided. At Block 36, a metallic liquid is atomized in an atmosphere to form a metallic powder.

Those skilled in the art will appreciate that the metallic liquid may be formed by melting ingots of a pure metal or of a desired alloy. Moreover, the metallic liquid may be formed by melting ingots of different metals, mixing when melted or during melting to form a metallic liquid containing a desired alloy. Furthermore, the metallic liquid may be formed by melting a metallic powder. Various processes may utilized to melt the ingots or powder.

In some embodiments, the atomization may produce an amorphous metallic powder. In other embodiments, the atomization may produce a crystalline metallic powder.

It will be appreciated by those of skill in the art that the atmosphere may be an oxidizing atmosphere, at a desired temperature, and at a desired pressure. Atomizing the metallic liquid in an oxidizing atmosphere may facilitate the formation of in-situ oxide shells that may enhance certain properties of the metallic liquid.

In some embodiments, the atmosphere may instead be an inert atmosphere, preferably comprising nitrogen and/or argon, although it is to be understood that other inert atmospheres, or even a vacuum, may be used. Atomization in such an inert atmosphere may increase the likelihood that each droplet or particle formed during the atomization process has a uniform size, shape, and/or chemistry.

At Block 38, the metallic powder is milled to form a nanosized metallic powder. The metallic powder may be milled for a desired length of time and according to one or more conventional milling processes as understood by those skilled in the art. For example, the milling processes may include cryomilling, ball milling, and/or jet milling. Furthermore, the metallic powder may be milled multiple times by the same milling process, or may alternatively be milled multiple times by different milling processes.

At Block 40, the nanosized metallic powder is thermally sprayed onto the combustion turbine component substrate to form an alloy coating on the combustion turbine component substrate. The alloy coating comprises, by percentage of weight, 25% to 35% of Ni, 15% to 25% of Cr, 6% to 15% of Al, and 0.05% to 5% of Y. The alloy coating further comprises, by percentage of weight, 0.4% to 4%, total, of at least one of Ti, Ta, W, and Re, 0.1% to 5%, total, of at least one rare earth oxide, with a balance of Co and O.

It is to be understood that any of a number of commercially available thermal spraying process may be employed. For example, plasma spraying, combustion spraying, and/or cold spraying may be employed.

The nanosize of the metallic powder may advantageously allow for a finer splat structure that results in a more dense alloy coating. This greater density may facilitate superior properties, such as decreased porosity, greater hardness, greater creep resistance, and enhanced wear resistance.

One of skill in the art will recognize that a bond coating may be formed on the combustion turbine component substrate prior to thermal spraying. The bond coating may be formed using techniques and materials known to those skilled in the art. For example, the bond coating may comprise a brazing layer.

At Block 42, a thermal barrier coating is formed on the combustion turbine component, after the thermal spraying. The thermal barrier coating may be formed using techniques and materials known to those skilled in the art. The thermal barrier coating may have, for example, a duplex structure, with a ceramic coating on top of a thermal barrier bond coat. The ceramic coating is typically made of yttria stabilized zirconia (YSZ) which is desirable for having very low conductivity while remaining stable at nominal operating temperatures typically seen in applications. The thermal barrier bond coat creates a superior bond between the ceramic coat and substrate, facilitating increased cyclic life while protecting the substrate from thermal oxidation and corrosion.

The thermal barrier coating serves to insulate the combustion turbine component from large and prolonged heat loads by utilizing thermally insulating materials that can sustain an appreciable temperature difference between the load bearing alloys and the coating surface. In doing so, the thermal barrier coating can allow for higher operating temperatures while limiting the thermal exposure of combustion turbine component, extending part life by reducing oxidation and thermal fatigue.

Figure 5:
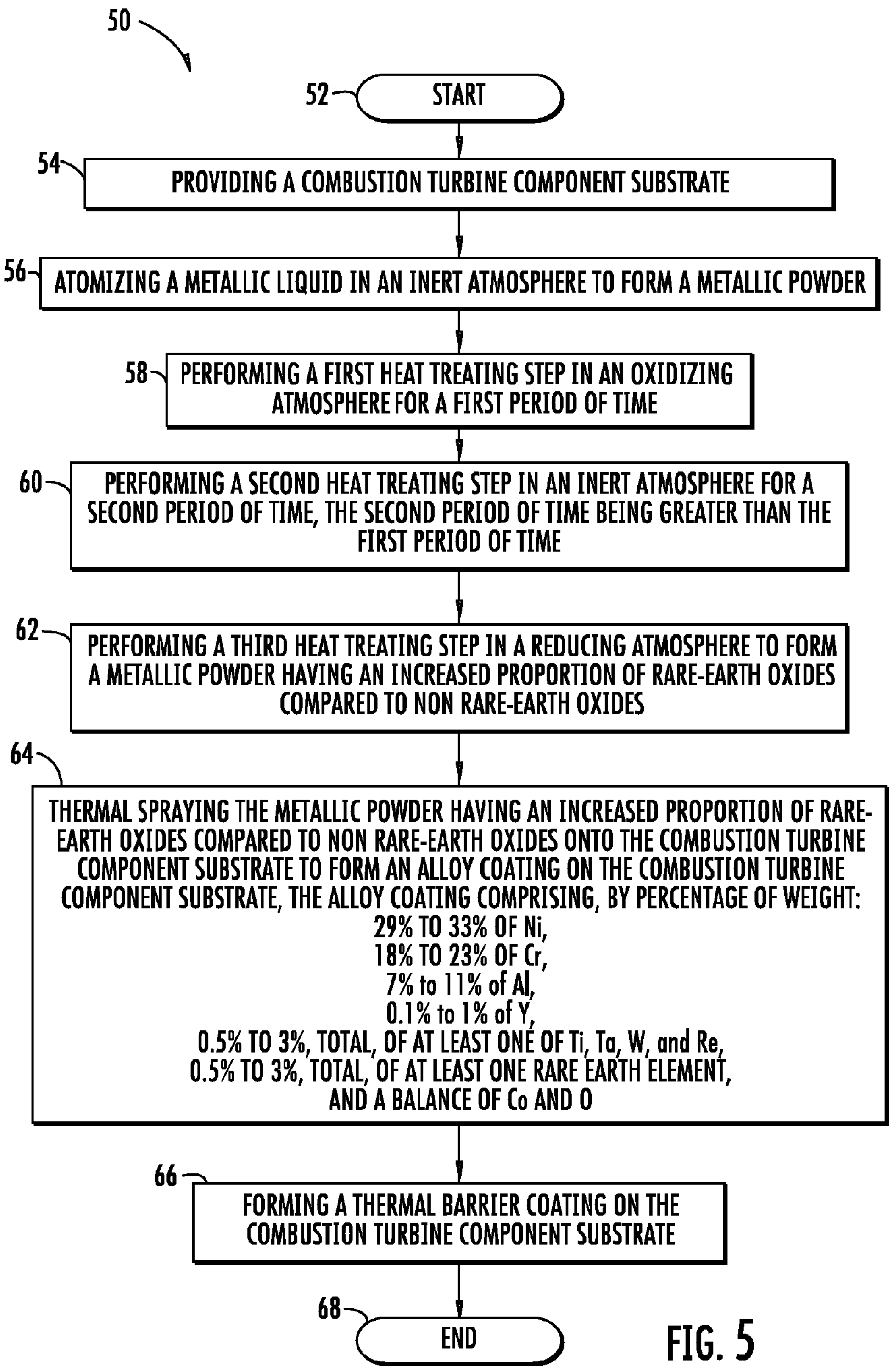
FIG. 5 is a flowchart of yet another embodiment of a method in accordance with the present invention.

Yet another embodiment of a method of making a combustion turbine component is now described generally with reference to the flowchart 50 of FIG. 5. After the start (Block 52), at Block 54, a combustion turbine component substrate is provided. At Block 56, a metallic liquid is atomized in an inert atmosphere to form a metallic powder. The inert atmosphere preferably comprises nitrogen and/or argon, although it is to be understood that other inert atmospheres, or even a vacuum, may be used.

At Block 58, a first heat treating step is performed on the metallic powder in an oxidizing atmosphere. The first heat treating step is preferably performed in a furnace. The first heat treating step may be performed for a first time period in a range of about 30 to 120 minutes, and more preferably about 45 to 60 minutes. Furthermore, the first heat treating step may be performed and at a first temperature range of about 900° C. to 1200° C., and more preferably about 1000° to 1100° C., with a concentration of oxygen in a range of 3 to 25% and more preferably about 4 to 8% at ambient pressure. It will be appreciated by those of skill in the art that the first heat treating step may be performed for other time periods, at other temperatures, and at other pressures.

This first heat treating step forms a metallic powder with a fine coating of oxides and/or nitrides. Applicants theorize without wishing to be bound thereto that, at this point, due to the small percentage by weight of rare-earth elements and the comparatively slow diffusivity of rare-earth atoms, the oxides formed contain mainly non rare-earth elements.

At Block 60, a second heat treating step is performed on the metallic powder in an inert atmosphere. Applicants theorize without wishing to be bound thereto that this allows extensive diffusion to occur and that the greater thermodynamic stability of rare-earth oxides as opposed to the non rare-earth oxides will result in a reduction of the pre-existing oxides and an increase of rare-earth oxides.

The second heat treating step may be performed for a second time period in a range of about 120 to 300 minutes, and more preferably about 180 to 240 minutes. Moreover, the second heat treating step may be performed and at a second temperature range of about 1100° to 1300° C., and more preferably about 1150° to 1250° C., and at ambient pressure. It will be appreciated by those of skill in the art that the second heat treating step may be performed for other time periods, at other temperatures, and at other pressures.

At Block 62, a third heat treating step is performed on the metallic powder in a reducing atmosphere to form a metallic powder having an increased proportion of rare-earth oxides compared to non rare-earth oxides. It will be appreciated by those of skill in the art that the rare-earth oxides formed may be nanosized. The third heat treating step may be performed for a third time period in a range of about 30 to 120 minutes, and more preferably about 45 to 60 minutes. Furthermore, the third heat treating step may be performed and at a third temperature range of about 800° to 1200° C., and more preferably about 900° to 1100° C., with a concentration of hydrogen in a range of 10% to 99% and more preferably about 20% to 95% at ambient pressure. It will be appreciated by those of skill in the art that the third heat treating step may be performed for other time periods, at other temperatures, and at other pressures.

Applicants theorize without wishing to be bound thereto that this third heat treating, or annealing, step is performed to improve the bonds formed by the metallic powder in subsequent processes and to reduce the amount of detrimental oxides, such as chromia, and iron oxide, as much as possible. The reducing atmosphere reduces the amount of remaining surface oxides but lacks sufficient thermodynamic stability to reduce the rare-earth oxides.

At Block 64, the metallic powder having an increased proportion of rare-earth oxides compared to non rare-earth oxides is thermally sprayed onto the combustion turbine component substrate to form an alloy coating on the combustion turbine component substrate. The alloy coating comprises, by percentage of weight, 29% to 33% of Ni, 18% to 23% of Cr, 7% to 11% of Al, and 0.1% to 1% of Y. The alloy coating further comprises, by percentage of weight, 0.5% to 3%, total, of at least one of Ti, Ta, W, and Re, 0.5% to 3%, total, of at least one rare earth oxide, and a balance of Co and O.

Furthermore, at Block 66, a thermal barrier coating is formed on the combustion turbine component substrate.

Applicants theorize without wishing to be bound thereto that the increased proportion of rare-earth oxides advantageously provides the combustion turbine component with increased creep resistance and increased fatigue resistance. Moreover, the rare-earth oxides may provide the combustion turbine component with improved high temperature oxidation resistance. These desirable properties may result from the exemplary thermodynamic stability and high bond energy of rare-earth oxides.

Figure 6:
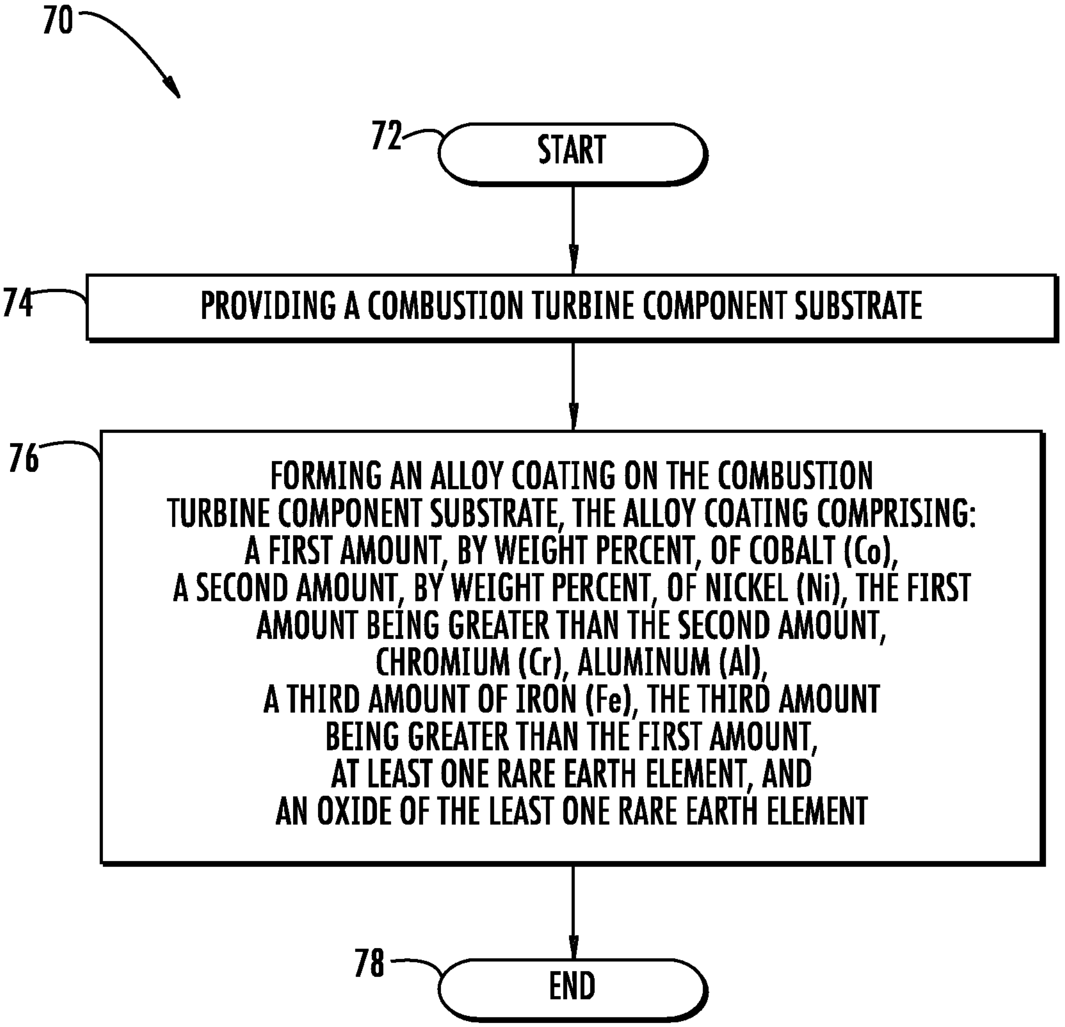
FIG. 6 is a flowchart of a further embodiment of a method in accordance with the present invention.

A further embodiment of a method of making a combustion turbine component is now described generally with reference to the flowchart 70 of FIG. 6. After the start (Block 72), at Block 74, a combustion turbine component substrate is provided. The combustion turbine component substrate may be a metallic combustion turbine component substrate, or may alternatively be of other suitable materials as will be appreciated by those skilled in the art.

At Block 76 an alloy coating is formed on the combustion turbine component substrate. The alloy coating comprises a first amount, by weight percent, of cobalt (Co) and a second amount, by weight percent, of nickel (Ni), the first amount being greater than the second amount. Moreover, the alloy coating also comprises chromium (Cr), aluminum (Al), and a third amount, by weight percent, of iron (Fe), the third amount being greater than the first amount. The alloy further comprises yttrium, at least one rare earth element, and an oxide of the at least one rare earth element.

Figure 7:
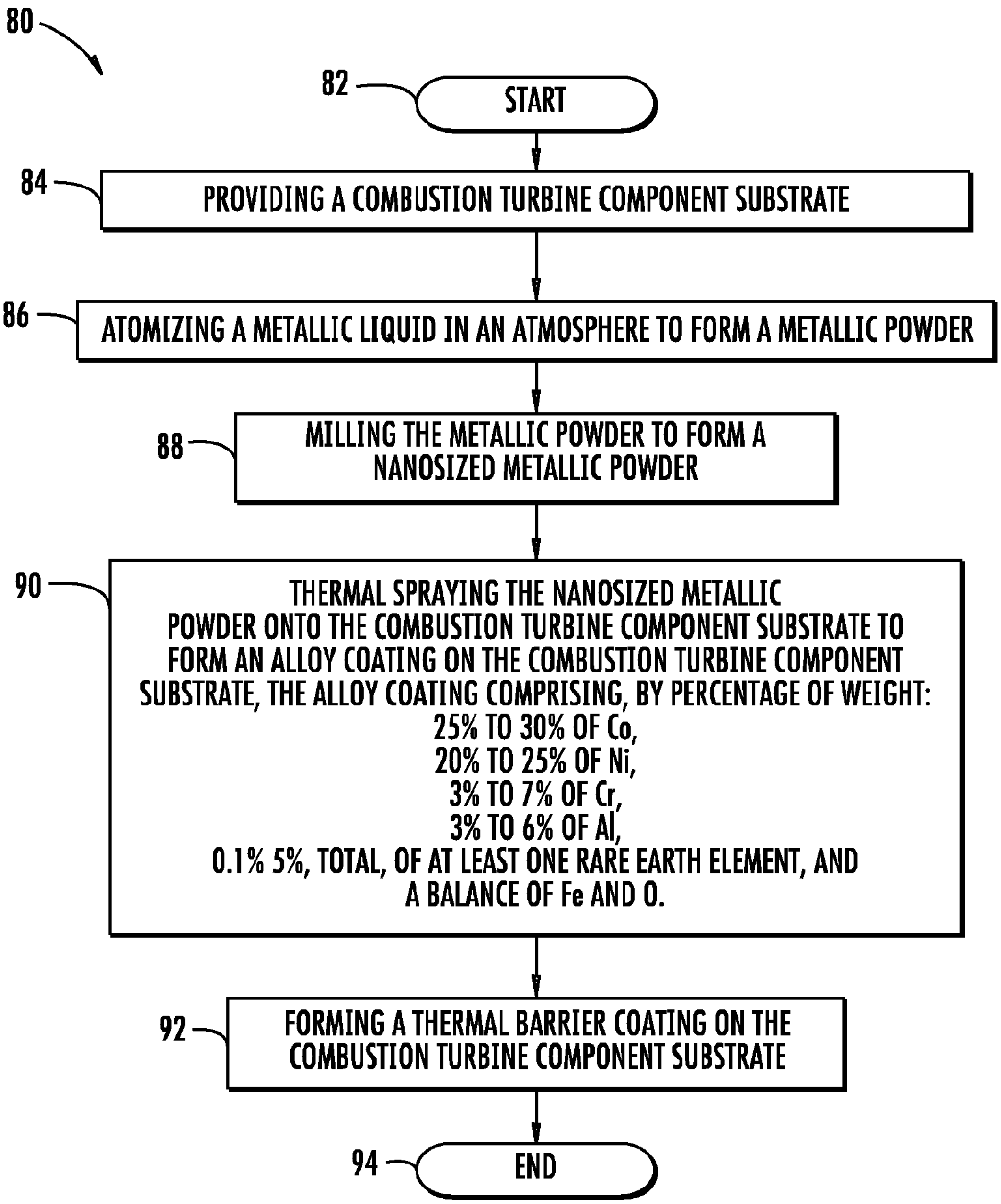
FIG. 7 is a flowchart of another embodiment of a method in accordance with the present invention.

Another embodiment of a method of making a combustion turbine component now described generally with reference to the flowchart 80 of FIG. 7. After the start (Block 82), at Block 84, a combustion turbine component substrate is provided. At Block 86, a metallic liquid is atomized in an atmosphere to form a metallic powder.

At Block 88, the metallic powder is milled to form a nanosized metallic powder. At Block 90, the nanosized metallic powder is thermally sprayed onto the combustion turbine component substrate to form an alloy coating on the combustion turbine component substrate. The alloy coating comprises, by percentage of weight, 25% to 30% of Co, 20% to 25% of Ni, 3% to 7% of Cr, 3% to 6% of Al, 0.1% to 5%, total, of at least one rare earth oxide, with a balance of Fe and O. In some embodiments, the percentage of weight of the oxides may be 0.2% to 2% and the concentration rare earth elements may decrease accordingly.

At Block 92, a thermal barrier coating is formed on the combustion turbine component, after the thermal spraying. Further details of the atomizing, milling, thermal spraying, and thermal barrier coating of this embodiment are explained in detail above with reference to FIGS. 4-5.

Figure 8:
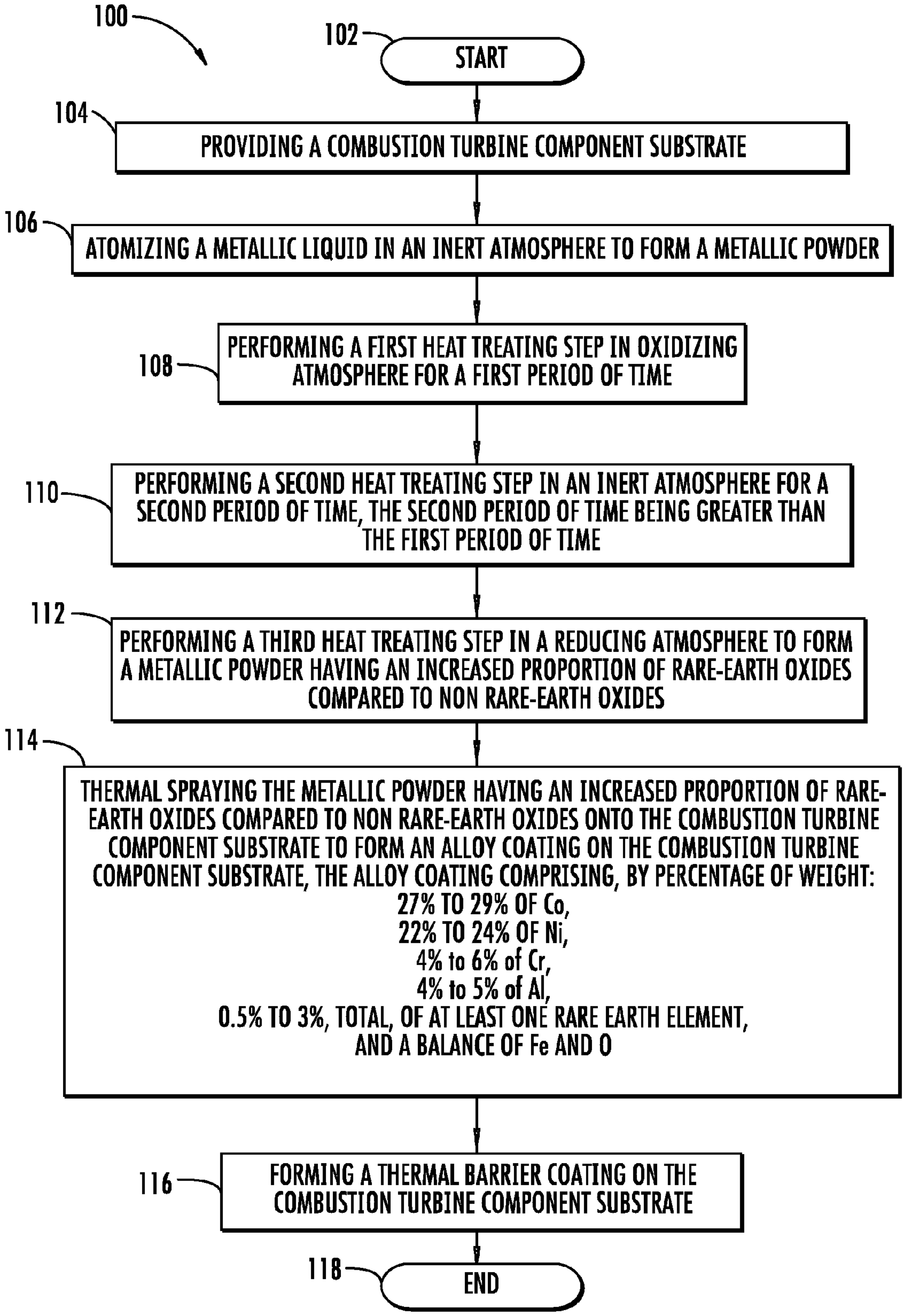
FIG. 8 is a flowchart of another alternative embodiment of a method in accordance with the present invention.

Another alternative embodiment of a method of making a combustion turbine component is now described generally with reference to the flowchart 100 of FIG. 8. After the start (Block 102), at Block 104, a combustion turbine component substrate is provided. At Block 106, a metallic liquid is atomized in an inert atmosphere to form a metallic powder. The inert atmosphere preferably comprises nitrogen and/or argon, although it is to be understood that other inert atmospheres, or even a vacuum, may be used.

At Block 108, a first heat treating step is performed on the metallic powder in an oxidizing atmosphere. At Block 110, a second heat treating step is performed on the metallic powder in an inert atmosphere. At Block 112, a third heat treating step is performed on the metallic powder in a reducing atmosphere to form a metallic powder having an increased proportion of rare-earth oxides compared to non rare-earth oxides.

At Block 114, the metallic powder having an increased proportion of rare-earth oxides compared to non rare-earth oxides is thermally sprayed onto the combustion turbine component substrate to form an alloy coating on the combustion turbine component substrate. The alloy coating comprises, by percentage of weight, 27% to 29% of Co, 22% to 24% of Ni, 4% to 6% of Cr, 4% to 5% of Al, 0.5% to 3%, total, of at least one rare earth oxide, and a balance of Fe and O. In some embodiments, the percentage of weight of the oxides may be 0.4% to 1% and the concentration of rare earth elements may decrease accordingly.

Furthermore, at Block 116, a thermal barrier coating is formed on the combustion turbine component substrate. Further details of the atomizing, first, second, and third heat treating steps, thermal spraying, and thermal barrier coating are explained in detail above with reference to FIGS. 4-5.

Other features related to the embodiments herein are described in copending applications METHOD OF FORMING MOLYBDENUM BASED WEAR RESISTANT COATING ON A WORKPIECE 12/198,478 and METHOD OF MAKING RARE-EARTH STRENGTHENED COMPONENTS 12/194,154.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A combustion turbine component comprising:
a combustion turbine component substrate; and
an alloy coating on said combustion turbine component substrate comprising
a first amount, by weight percent, of cobalt (Co), a second amount, by weight percent, of nickel (Ni), the first amount being greater than the first amount,
chromium (Cr), aluminum (Al), rhenium (Re),
at least one additional rare earth element, and
an oxide of the at least one additional rare earth element.

2. The combustion turbine component of claim 1, wherein said alloy coating further comprises a third amount, by weight percent, of iron (Fe), the third amount being greater than the first amount.

3. The combustion turbine component of claim 2, wherein said alloy coating comprises, by percentage of weight, 25% to 30% of Co; 20% to 25% Ni; 3% to 7% of Cr; 3% to 6% of Al; 0.1% to 5%, total, of at least one additional rare earth element; and a balance of Fe and O.

4. The combustion turbine component of claim 2, wherein said alloy coating comprises, by percentage of weight, 27% to 29% of Co; 22% to 24% Ni; 4% to 6% of Cr; 4% to 5% of Al; 0.5% to 3%, total, of at least one additional rare earth element; and a balance of Fe and O.

5. The combustion turbine component of claim 1, wherein said alloy coating further comprises yttrium (Y); and at least one of titanium (Ti), tantalum (Ta), and tungsten (W); and wherein said oxide comprises an oxide of at least one of the yttrium and the at least one additional rare earth element.

6. The combustion turbine component of claim 5, wherein said alloy coating comprises, by percentage of weight, 25% to 35% of Ni; 15% to 25% of Cr; 6% to 15% of Al; and 0.05% to 5% of Y.

7. The combustion turbine component of claim 6, wherein said alloy coating further comprises, by percentage of weight, 0.4% to 4%, total, of Re and at least one of Ti, Ta, and W; 0.1% to 5%, total, of at least one additional rare earth oxide; and a balance of Co and O.

8. The combustion turbine component of claim 5, wherein said alloy coating comprises, by percentage of weight, 29% to 33% of Ni; 18% to 23% of Cr; 7% to 11% of Al; and 0.1% to 1% of Y.

9. The combustion turbine component of claim 8, wherein said alloy coating further comprises, by percentage of weight, 0.5% to 3%, total, of Re and at least one of Ti, Ta, and W; 0.5% to 3%, total, of at least one additional rare earth oxide; and a balance of Co and O.

10. The combustion turbine component of claim 1, further comprising a thermal barrier coating on said alloy coating.

11. The combustion turbine component of claim 1, wherein said at least one additional rare earth element comprises at least one of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu).

12. A combustion turbine component comprising:
a metallic combustion turbine component substrate; and
an alloy coating on said metallic combustion turbine component substrate comprising, by weight percent,
25% to 35% of Ni,
15% to 25% of Cr,
6% to 15% of Al,
0.05% to 5% of Y,
0.4% to 4%, total, of Re and at least one of Ti, Ta, and W, 0.1% to 5%, total, of at least one additional rare earth element, and a balance of Co and O.

13. The combustion turbine component of claim 12, wherein said alloy coating comprises, by percentage of weight, 29% to 33% of Ni; 18% to 23% of Cr; 7% to 11% of Al; 0.1% to 1% of Y; 0.5% to 3%, total, of Re and at least one of Ti, Ta, and W; 0.5% to 3%, total, of at least one additional rare earth element; and a balance of Co and O.

14. The combustion turbine component of claim 12, further comprising a thermal barrier coating on said alloy coating.

15. The combustion turbine component of claim 12, wherein said at least one additional rare earth element comprises at least one of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu).

16. A method of making a combustion turbine component comprising:

forming a combustion turbine component substrate;

applying an alloy coating on the combustion turbine component substrate, the alloy coating comprising a first amount, by weight percent, of cobalt (Co), a second amount, by weight percent, of nickel (Ni), the first amount being greater than the second amount, chromium (Cr), aluminum (Al), rhenium (Re), at least one additional rare earth element, and an oxide of the at least one additional rare earth element.

17. The method of claim 16, wherein the alloy coating further comprises a third amount, by weight percent, of iron (Fe), the third amount being greater than the first amount.

18. The method of claim 17, wherein the alloy coating comprises, by percentage of weight, 25% to 30% of Co; 20% to 25% Ni; 3% to 7% of Cr; 3% to 6% of Al; 0.1% to 5%, total, of at least one additional rare earth element; and a balance of Fe and O.

19. The method of claim 17, wherein the alloy coating comprises, by percentage of weight, 27% to 29% of Co; 22% to 24% Ni; 4% to 6% of Cr; 4% to 5% of Al; 0.5% to 3%, total, of at least one additional rare earth element; and a balance of Fe and O.

20. The method of claim 16, wherein the alloy coating further comprises yttrium (Y); and at least one of titanium (Ti), tantalum (Ta), and tungsten (W); and wherein the oxide comprises an oxide of at least one of the yttrium and the at least one additional rare earth element.

21. The method of claim 20, wherein the alloy coating comprises, by percentage of weight, 25% to 35% of Ni; 15% to 25% of Cr; 6% to 15% of Al; and 0.05% to 5% of Y.

22. The method of claim 21, wherein the alloy coating further comprises, by percentage of weight, 0.4% to 4%, total, of Re and at least one of Ti, Ta, and W; 0.1% to 5%, total, of at least one rare earth oxide; and a balance of Co and O.

23. The method of claim 20, wherein the alloy coating comprises, by percentage of weight, 29% to 33% of Ni; 18% to 23% of Cr; 7% to 11% of Al; and 0.1% to 1% of Y.

24. The method of claim 23, wherein the alloy coating further comprises, by percentage of weight, 0.5% to 3%, total, of Re and at least one of Ti, Ta, and W; 0.5% to 3%, total, of at least one rare earth oxide; and a balance of Co and O.

25. The method of claim 16, wherein applying the alloy coating on the combustion turbine component substrate comprises:

atomizing a metallic liquid in an atmosphere to form a metallic powder;

milling the metallic powder to form a nanosized metallic powder; and thermal spraying the nanosized metallic powder onto the combustion turbine component substrate.

26. The method of claim 25, wherein the atmosphere comprises an oxidizing atmosphere.

27. The method of claim 25, further comprising forming a thermal barrier coating on the combustion turbine component substrate after thermal spraying.

28. The method of claim 16, wherein applying the alloy coating on the combustion turbine component substrate comprises:

atomizing a metallic liquid to form a metallic powder;

performing a series of heat treating steps on the metallic powder comprising a first heat treating step performed in an oxidizing atmosphere, a second heat treating step performed in an inert atmosphere, and a third heat treating step performed in a reducing atmosphere to form a metallic power having an increased proportion of rare-earth oxides compared to non rare-earth oxides; and thermal spraying the metallic powder having an increased proportion of rare-earth oxides compared to non rare-earth oxides onto the combustion turbine component substrate.

29. The method of claim 28, wherein the first heat treating step is performed for a first period of time; and wherein the second heat treating step is performed for a second period of time; and wherein the second period of time is greater than the first period of time.

30. The method of claim 28, further comprising forming a thermal barrier coating after the thermal spraying.

31. A method of making a combustion turbine component comprising:

forming a combustion turbine component substrate;

applying an alloy coating on the combustion turbine component substrate by at least atomizing a metallic liquid to form a metallic powder;

performing a series of heat treating steps on the metallic powder comprising a first heat treating step performed in an oxidizing atmosphere, a second heat treating step performed in an inert atmosphere, and a third heat treating step performed in a reducing atmosphere to form a metallic power having an increased proportion of rare-earth oxides compared to non rare-earth oxides; and thermal spraying the metallic powder having an increased proportion of rare-earth oxides compared to non rare-earth oxides onto the combustion turbine component substrate, the alloy coating comprising a first amount, by weight percent, of cobalt (Co), a second amount, by weight percent, of nickel (Ni), the first amount being greater than the second amount, chromium (Cr), aluminum (Al), at least one additional rare earth element, and an oxide of the at least one additional rare earth element.

32. The method of claim 31, wherein the first heat treating step is performed for a first period of time; and wherein the second heat treating step is performed for a second period of time; and wherein the second period of time is greater than the first period of time.

33. The method of claim 32, further comprising forming a thermal barrier coating after the thermal spraying.

34. The method of claim 31, further comprising milling the metallic powder to form a nanosized metallic powder after atomizing the metallic liquid; wherein the series of heat treating steps are performed on the nanosized metallic powder; and wherein the nanosized metallic powder is thermal sprayed.

35. The method of claim 31, wherein the metallic powder is atomized in an oxidizing atmosphere.

* * * * *